(12) United States Patent
Miyake et al.

(10) Patent No.: US 8,050,826 B2
(45) Date of Patent: Nov. 1, 2011

(54) CHARACTERISTIC CORRECTION SYSTEM FOR AUTOMATIC TRANSMISSION

(75) Inventors: Yasuyuki Miyake, Tokyo (JP); Keisuke Ajimoto, Tokyo (JP); Satoshi Ogawa, Tokyo (JP); Kazuhiko Simonaka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1022 days.

(21) Appl. No.: 11/939,177

(22) Filed: Nov. 13, 2007

(65) Prior Publication Data
US 2008/0139361 A1 Jun. 12, 2008

(30) Foreign Application Priority Data
Nov. 14, 2006 (JP) .................. 2006-308267

(51) Int. Cl.
F16D 43/28 (2006.01)
G06F 19/00 (2006.01)
(52) U.S. Cl. .......................... 701/51; 701/59
(58) Field of Classification Search .......... None
See application file for complete search history.

(56) References Cited

U.S. PATENT DOCUMENTS

| 5,456,647 | A | * | 10/1995 | Holbrook | 477/154 |
| 6,155,948 | A | * | 12/2000 | Gierer | 475/123 |
| 7,090,614 | B2 | * | 8/2006 | Takagi | 477/61 |
| 2004/0186637 | A1 | * | 9/2004 | Isogai et al. | 701/29 |
| 2005/0267618 | A1 | * | 12/2005 | Kano et al. | 700/110 |
| 2006/0229788 | A1 | | 10/2006 | Miyake | |

FOREIGN PATENT DOCUMENTS
JP 2003-014119 1/2003
JP 2004-286062 10/2004
* cited by examiner

*Primary Examiner* — Michael J. Zanelli
(74) *Attorney, Agent, or Firm* — Smith, Gambrell & Russell, LLP

(57) ABSTRACT

The input rotation speed of an automatic transmission is fixed, and an output shaft is fixed. Oil pressure supplied to a measurement subject engagement element is then increased, and a determination is made as to whether or not rotary variation in a turbine rotation speed is equal to or greater than a set value. When the rotary variation reaches or exceeds the set value, an oil pressure controlled variable at this time is measured and stored. Then, on the basis of the measurement data, a correction amount relating to the unique characteristic variation of the automatic transmission incorporated into a vehicle body is determined and written to a TCU.

5 Claims, 4 Drawing Sheets

OIL PRESSURE CONTROLLED VARIABLE

CHARACTERISTIC CORRECTION SYSTEM FOR AUTOMATIC TRANSMISSION

CROSS-REFERENCE TO RELATED APPLICATION

The disclosure of Japanese Patent Application No. 2006-308267 filed on Nov. 14, 2006 including the specification, drawings and abstract is incorporated herein by reference in its entirety.

BACKGROUND OF THE INVENTION

1. Field of the Invention

The present invention relates to a characteristic correction system for an automatic transmission, which is capable of obtaining a favorable shift quality by correcting characteristic variation among individual transmissions.

2. Description of the Related Art

Component tolerance typically exists in each constitutional element of an automatic transmission installed in a vehicle such as an automobile, and therefore slight variation in the characteristics of the transmission in its final assembled state due to individual differences is inevitable. To improve the performance of the vehicle, the amount of variation must be suppressed as much as possible, but at the same time, reducing tolerance while ensuring process capability in a production factory may lead to repercussions such as cost increases.

In a so-called direct AT system automatic transmission which controls the engagement (or in other words the oil pressure) of engagement elements such as clutches and brakes by providing each engagement element with a solenoid valve, variation in the shift quality is particularly likely to occur due to manufacturing irregularities in the solenoid valves and engagement elements, deterioration thereof with age, friction, and so on. To reduce this variation in the shift quality and obtain a stable, favorable shift quality, learning control is typically performed during actual travel. However, a considerable amount of actual travel time is required to secure a favorable shift quality through learning control.

Hence, Japanese Unexamined Patent Application Publication No. 2003-14119 proposes a technique that is executed during a test performed on a transmission prior to installation in a vehicle, in which a drive signal applied to a solenoid valve of a hydraulic control device, piston stroke data and engagement pressure data relating to a hydraulic servo for operating an engagement element of the transmission, and so on are obtained as unique data and stored in a memory of an electronic control unit.

Further, in Japanese Unexamined Patent Application Publication No. 2004-286062, the present applicant proposes a technique of measuring a controlled variable of a hydraulic control valve, which maintains the difference between an input rotation speed and a turbine rotation speed of a torque converter at a fixed value, during a completion operation performed on an automatic transmission following assembly, and correcting characteristic variation among individual automatic transmissions on the basis of a difference between a measured value and a reference value of the controlled variable.

If characteristic variation in an automatic transmission is to be corrected without waiting for the promotion of learning through actual travel, it is desirable to be able to obtain data that are unique to each individual transmission and differences between the unique data and reference characteristics quickly and with stability in consideration of the factory task time at the product shipping stage, the time required for a market dealer to reset a learned value during inspection and repair by cutting the power of the electronic control device, and so on. In this regard, however, Japanese Unexamined Patent Application Publication No. 2003-14119 does not disclose a specific method of obtaining unique data, and although in Japanese Unexamined Patent Application Publication No. 2004-286062 a unique controlled variable of the transmission can be measured with stability, the measurement time tends to be long, leaving room for improvement.

SUMMARY OF THE INVENTION

The present invention has been designed in consideration of the circumstances described above, and an object thereof is to provide a characteristic correction system for an automatic transmission, which is capable of obtaining data that are unique to a transmission quickly and with stability so that characteristic variation among individual transmissions can be corrected without waiting for the promotion of learning through actual travel, as a result of which a favorable shift quality can be obtained.

To achieve this object, the present invention is a characteristic correction system for an automatic transmission that performs a shift operation by engaging and disengaging engagement elements in a multi-stage transmission unit provided alongside a torque converter using respective hydraulic control valves, comprising: means for releasing an arbitrary engagement element of the multi-stage transmission unit, increasing an oil pressure supplied to the released engagement element via a corresponding hydraulic control valve in a state where an input shaft rotation speed is fixed by fixing an output shaft of the automatic transmission, and measuring an oil pressure controlled variable at a point where a turbine rotation speed of the torque converter varies; and means for determining a correction amount relative to a reference controlled variable from a measurement value of the oil pressure controlled variable, and storing the correction amount in an electronic control device for controlling the automatic transmission.

The characteristic correction system for an automatic transmission according to the present invention is capable of obtaining data that are unique to a transmission quickly and with stability so that characteristic variation among individual transmissions can be corrected without waiting for the promotion of learning through actual travel, and as a result, a favorable shift quality can be obtained.

DESCRIPTION OF THE PREFERRED EMBODIMENT

An embodiment of the present invention will be described below with reference to the drawings. FIGS. 1 to 4 relate to an embodiment of the present invention, FIG. 1 being an illustrative view showing a characteristic correction system for an automatic transmission, FIG. 2 being a flowchart showing processing for measuring the characteristics of the automatic transmission and calculating a correction amount, FIG. 3 being an illustrative view showing an allowable range relating to an ATF temperature, and FIG. 4 being an illustrative view showing a correlation between an oil pressure controlled variable and an oil pressure correction amount.

Figure 1:
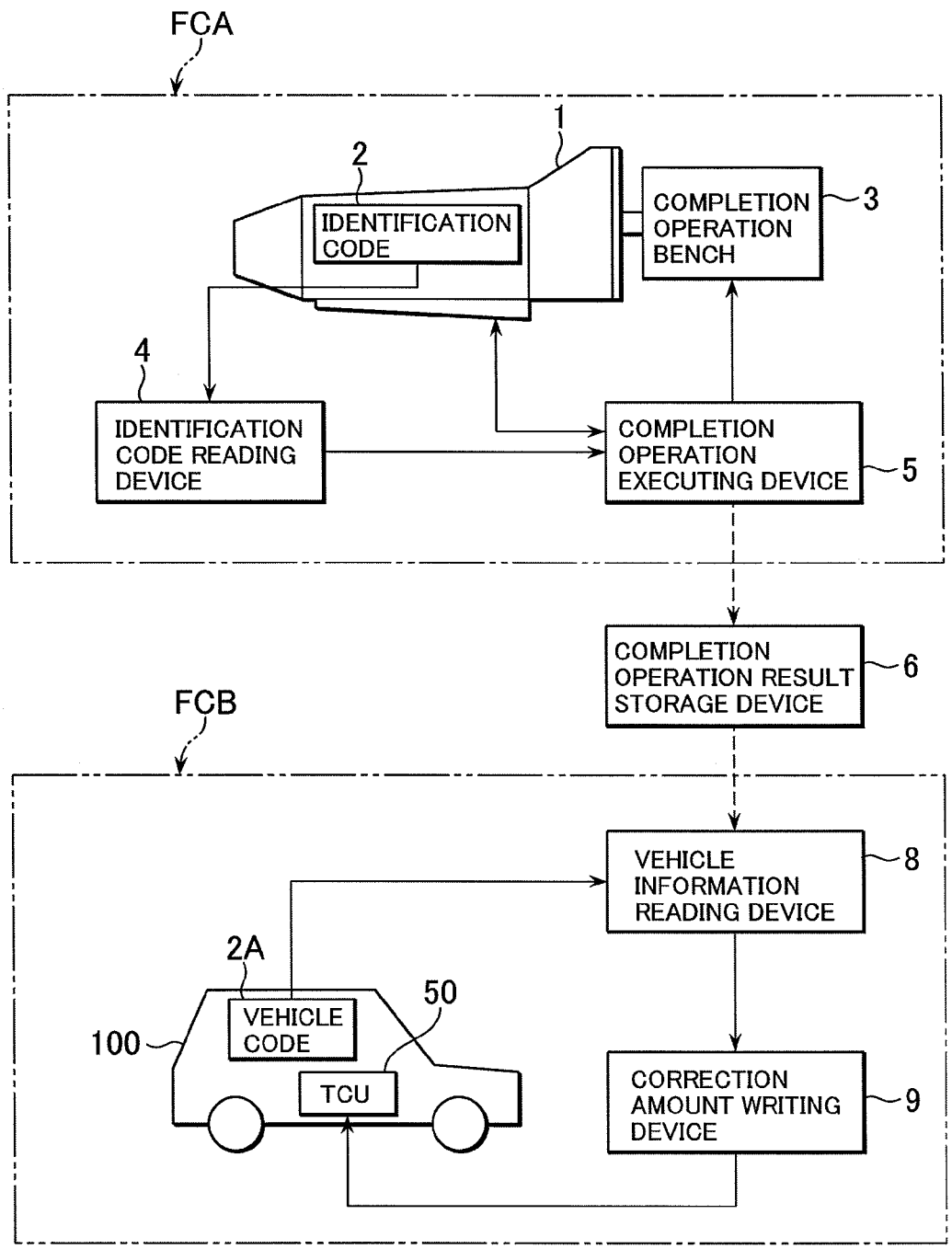
FIG. 1 is an illustrative view showing a characteristic correction system for an automatic transmission.

FIG. 1 shows a characteristic correction system for correcting characteristic variation among individual automatic transmissions installed in a vehicle such as an automobile. The characteristic correction system may be constructed as a system installed in a vehicle or a system provided on a production/shipping line in a factory. In this embodiment, an example in which the characteristic correction system for an automatic transmission is constructed on a production/shipping line in a factory will be described. A reference symbol FCA shown in FIG. 1 denotes a completion operation process for performing a characteristic test on a completed automatic transmission 1 that has been assembled on a transmission assembly line, and a reference symbol FCB denotes a vehicle assembly process for incorporating and installing the automatic transmission 1, which has been conveyed from the transmission assembly line, into a vehicle body 100 together with an electronic control device (TCU) 50.

The automatic transmission 1 is a so-called direct AT system automatic transmission which controls the engagement (or in other words the oil pressure) of engagement elements such as clutches and brakes by providing each engagement element with a solenoid valve, and is similar to the automatic transmission disclosed by the present applicant in Japanese Unexamined Patent Application Publication No. 2003-004130. Schematically, the automatic transmission 1 comprises a torque converter for receiving driving force input from an engine output shaft, and a multi-stage gear shifting unit provided alongside the torque converter.

The multi-stage gear shifting unit comprises a planetary gear unit provided on an input shaft, and engagement elements including a high clutch for engaging and disengaging power transmission between the input shaft and a planetary carrier, a reverse clutch for engaging and disengaging power transmission between the input shaft and a sun gear, a 2-4 brake for engaging and disengaging power transmission between the sun gear and an automatic transmission case, a low clutch for engaging and disengaging power transmission between the planetary carrier and a ring gear, a low one-way clutch for engaging and disengaging power transmission in one direction between a low clutch drum that rotates integrally with the planetary carrier and the automatic transmission case, and a low-and-reverse (L-R) brake for engaging and disengaging power transmission between the low clutch drum and the automatic transmission case. Each engagement element of the multi-stage gear shifting unit is subjected to engagement control (oil pressure control) by driving a solenoid valve for regulating the oil pressure of a control valve.

The completion operation process FCA comprises a completion operation bench 3 for performing a characteristic test on the automatic transmission 1, an identification code reading device 4 for reading an identification code 2 to identify different specifications such as the model and engine type of the vehicle in which the automatic transmission 1 is to be installed, and a completion operation executing device 5 for controlling the completion operation bench 3 to execute a completion operation on the automatic transmission 1. The identification code 2 is formed as a one-dimensional or two-dimensional pattern of data such as numerals or alphabetic characters, affixed to each individual piece, and then conveyed to the vehicle assembly process FCB.

The completion operation performed on the completion operation bench 3 is executed and controlled by the complete operation executing device 5 with respect to each individual transmission using the identification code 2 read by the identification code reading device 4. In the completion operation, the solenoid valve for regulating the oil pressure of the control valve provided in the interior of the automatic transmission 1 and the completion operation bench 3 are controlled, a correction amount relating to characteristic variation in the automatic transmission 1 is determined, and a determination is made as to whether or not the automatic transmission 1 is to be shipped. These steps are performed simultaneously. The result of the completion operation of the automatic transmission 1 is stored in a completion operation result storage device 6 in association with the identification code 2 of each automatic transmission 1 and transmitted to the vehicle assembly process FCB via a communication line or a storage medium.

The vehicle assembly process FCB comprises a vehicle information reading device 8 for reading the completion operation result of the automatic transmission 1 corresponding to the identification code 2 from the completion operation result storage device 6 and a vehicle code 2A of the vehicle body 100 into which the automatic transmission 1 is to be incorporated together with the TCU 50, and a correction amount writing device 9 for writing data for correcting the characteristic variation of the automatic transmission 1 to the TCU 50.

In the vehicle assembly process FCB, the automatic transmission 1 is incorporated into the vehicle body 100, and the data for correcting the characteristic variation are written to the TCU 50 via the correction amount writing device 9 in a free roller check process performed on a chassis dynamometer at the line end. In the free roller check process, the vehicle code 2A of the vehicle body 100 is read via the vehicle information reading device 8, corresponding completion operation data are read from the completion operation result storage device 6, and a correction amount relating to the characteristic variation of each automatic transmission 1 is determined and written to the TCU 50.

The vehicle code 2A may be incorporated into the identification code 2 affixed to the automatic transmission 1. Generally, however, it is difficult to read the identification code 2 of the automatic transmission 1 once the automatic transmission 1 is installed in the vehicle body 100, and therefore the identification code 2 of the automatic transmission 1 may be replaced with a vehicle body number of the vehicle or the like when the automatic transmission 1 is installed in the vehicle body 100. In this case, a corresponding relationship between the vehicle body number and the identification code 2 of the automatic transmission 1 is stored in the vehicle information reading device 8.

The characteristic correction system described above compensates for characteristic variation among individual automatic transmissions 1 by storing a correction amount for correcting a deviation between an actual value and a reference value (reference controlled variable) of an oil pressure controlled variable relating to each engagement element of the automatic transmission 1 in the memory of the TCU 50. The correction amount for correcting the deviation with the reference controlled variable is calculated on the basis of an actual oil pressure controlled variable, which is measured by operating the automatic transmission 1 under set conditions.

More specifically, to improve the shift quality of the automatic transmission 1, it is important to apply an appropriate oil pressure commensurate with the input torque to each engagement element, and therefore variation having various causes, such as irregularities in the clutch clearance, the return spring of a clutch piston, and the sliding resistance, deviation between the actual oil pressure and an indicated control value produced by irregularities in the control characteristic of the oil pressure-regulating solenoid valve, and so on, must be eliminated.

In this embodiment, a correction amount that enables the acquisition of a favorable shift quality by eliminating variation caused by production tolerance while keeping the temperature of automatic transmission oil (ATF), the input rotation speed, and so on more stable than during actual travel is learned during the completion operation of the automatic transmission 1. The learned correction amount is then written to and stored in the TCU 50 for controlling the automatic transmission 1, thereby omitting the time required to promote learning through actual travel such that a favorable shift quality is obtained at the time of shipping.

More specifically, the output shaft of the automatic transmission 1 is fixed to the completion operation bench 3 and set in a predetermined shift position achieved by engaging an arbitrary engagement element to be measured, the engagement elements not to be measured are engaged/disengaged such that the predetermined gear shift position is achieved, and then the arbitrary engagement element to be measured is released. A constant input rotation speed is then applied to the torque converter while the output shaft of the automatic transmission 1 remains fixed, and in this state, the oil pressure supplied to the measurement subject engagement element is increased gradually via the solenoid valve for regulating the oil pressure of the control valve, which is constituted by a duty solenoid valve, a linear solenoid valve, or similar.

For example, when the measurement subject engagement element is a clutch and the supplied oil pressure is increased gradually from a state in which the clutch is released, the clutch piston begins to stroke in an engaging direction, and at the point where an engagement surface pressure counterbalances the input torque, variation occurs in the turbine rotation speed. This variation point in the turbine rotation speed may be considered as the point at which engagement of the engagement element begins (the point at which the stroke of the clutch piston ends), and by storing a correction amount based on the deviation between the actual indicated oil pressure amount and a reference value at this time in the TCU 50 and reflecting the correction amount in learning control, a favorable shift quality can be secured from the time of shipping.

Figure 2:
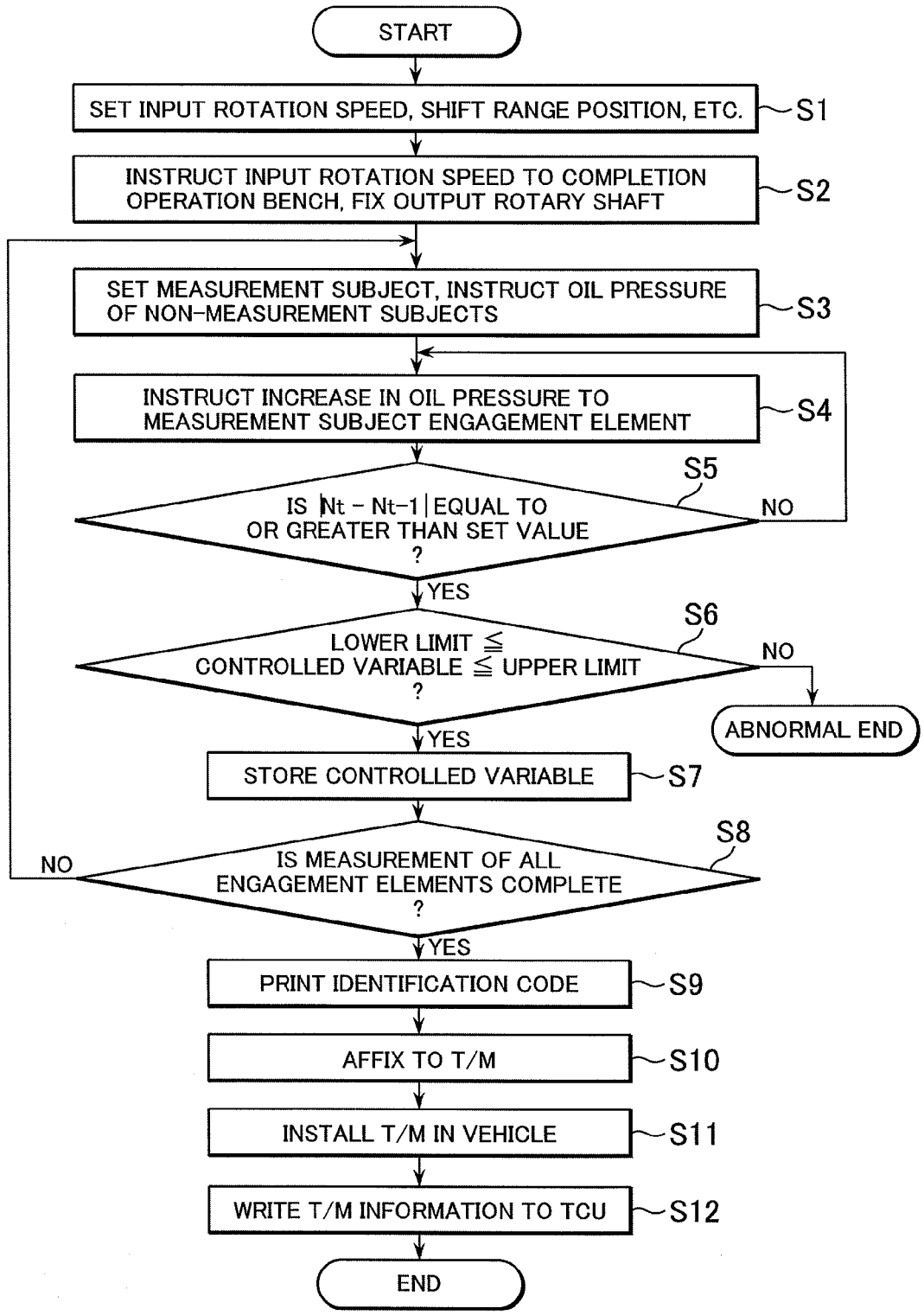
FIG. 2 is a flowchart showing processing for measuring the characteristics of the automatic transmission and calculating a correction amount.
Figure 3:
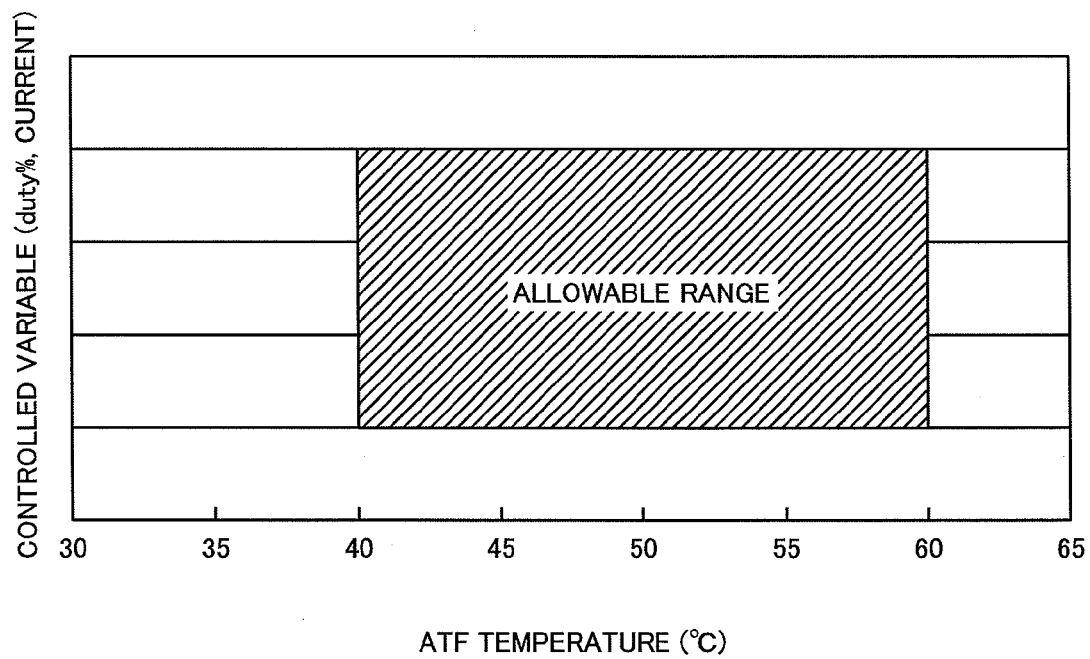
FIG. 3 is an illustrative view showing an allowable range relating to an ATF temperature.

Processing for measuring the characteristics of the automatic transmission 1 and calculating the correction amount will be described below using the flowchart in FIG. 2. The flowchart in FIG. 2 illustrates the flow of processing from the completion operation process FCA to the vehicle assembly process FCB.

In a first step S1 of the characteristic measurement and correction amount calculation processing, various types of setting are performed with respect to the input rotation speed of the automatic transmission 1, a shift range position, forward/reverse gear, and so on. Then, in a step S2, the input rotation speed of the automatic transmission 1 is set at a fixed rotation speed (900 rpm, for example), and an instruction to fix the output shaft is output to the completion operation bench 3.

The routine then advances to a step S3, where the oil pressure of a measurement subject engagement element is removed to release the engagement element, and an instruction is issued relating to the oil pressure to be applied to the engagement elements not subject to measurement. In a step S4, an instruction is output to increase the oil pressure applied to the measurement subject engagement element. This oil pressure increase instruction is set at an increase gradient allowing the actual oil pressure to remain close to the instructed oil pressure such that the dynamic characteristic of the engagement element is not adversely affected. For example, the oil pressure increase instruction is output as an instruction to control a drive duty or drive current relating to the oil pressure-regulating solenoid valve to a set value.

The routine then advances from the step S4 to a step S5, where a turbine rotation speed Nt of the torque converter is measured by a turbine rotation speed sensor to check for rotary variation, and a determination is made as to whether or not a rotary variation (Nt−Nt−1), which serves as variation in the turbine rotation speed before and after the oil pressure applied to the engagement element is increased in the step S4, is equal to or greater than a set value ΔN. If, as a result, the rotary variation (|Nt−Nt−1|) is smaller than the set value ΔN, the routine returns to the step S4 and continues to increase the oil pressure applied to the measurement subject engagement element. On the other hand, when the rotary variation (Nt−Nt−1) is equal to or greater than the set value ΔN in the step S5, the routine advances from the step S5 to a step S6, where the oil pressure controlled variable at this time is measured.

For example, when the oil pressure applied to a clutch that is engaged through contact with a frictional member, which serves as the measurement subject engagement element, is gradually increased, the piston strokes against a return spring force and sliding resistance so as to come into contact with the frictional member at a certain point in time. Since the transmission output shaft is fixed at this time, the turbine rotation speed varies in a decreasing direction at an arbitrary shift speed. Hence, by measuring the oil pressure controlled variable (for example, a drive duty of a duty solenoid valve or a drive current of a linear solenoid valve) when the variation in the turbine rotation speed reaches or exceeds the set value, the piston stroke end point, or in other words the engagement start point, of each individual transmission can be learned. Note that during measurement of the oil pressure controlled variable, related parameters such as the ATF temperature are measured simultaneously.

The routine then advances to a step S6, where a determination is made as to whether or not the measured oil pressure controlled variable is within an upper/lower limit range and within an allowable width range corresponding to a collection of design parameters including the return spring force, the piston stroke, the actual oil pressure amount relative to the instructed oil pressure value, and temperature dependency. For example, if the ATF temperature upon acquisition of the oil pressure controlled variable at the turbine rotation speed variation point is within an allowable range (approximately 40° C. to 60° C.) shown in FIG. 3, it is determined that the oil pressure controlled variable is within an upper/lower limit range of a normal operation, and therefore determined that the automatic transmission 1 may be shipped.

When the measured oil pressure controlled variable is within the upper/lower limit range, the automatic transmission 1 is determined to be normal, and the routine advances from a step S6 to a step S7, where the measured controlled variable, such as the drive duty or drive current, is stored and held in the completion operation result storage device 6 in association with the identification code of the automatic transmission 1, the measurement subject engagement element, and so on. The routine then advances to a step S8. On the other hand, when the measured controlled variable is not within the upper/lower limit range in the step S6, the automatic transmission 1 is determined to be defective, and the content of the defect is stored and held in the completion operation result storage device 6. The processing is then terminated.

In the step S8, a determination is made as to whether or not all of the engagement elements of the automatic transmission 1 have been measured. In this case, each measurement subject engagement element is preferably measured at least twice at different input rotation speeds such that measurement data relating to the oil pressure controlled variable are obtained at no less than two measurement points. In so doing, variation in the friction characteristic of the engagement member can be learned in addition to the deviation between the actual oil pressure and the indicated oil pressure, and therefore an appropriate oil pressure controlled variable can be applied in accordance with the input torque, which differs according to the traveling conditions. Thus, an improvement in shift quality can be achieved.

When all of the engagement elements have not yet been measured, the routine returns to the step S3 from the step S8, and in the step S3, the next measurement subject is set and the processing described above is repeated. On the other hand, when all of the engagement elements have been measured, the routine advances from the step S8 to a step S9, where an identification code including the unique data of each transmission, such as the ATF temperature and the oil pressure controlled variable at the time of measurement, is printed out. Then, in a step S10, a label of the printed identification code is affixed to the automatic transmission (T/M) 1.

The steps S1 to S10 described above constitute the processing of the completion operation process FCA. From a subsequent step S11, the processing of the vehicle assembly process FCB begins. In the step S11, the automatic transmission (T/M) 1 conveyed from the completion operation process FCA is incorporated into and installed in the vehicle body, and in a step S12, a correction amount relating to the unique characteristic variation of the automatic transmission 1 incorporated into the vehicle body 100 is determined and written to the TCU 50. The processing is then terminated.

Figure 4:
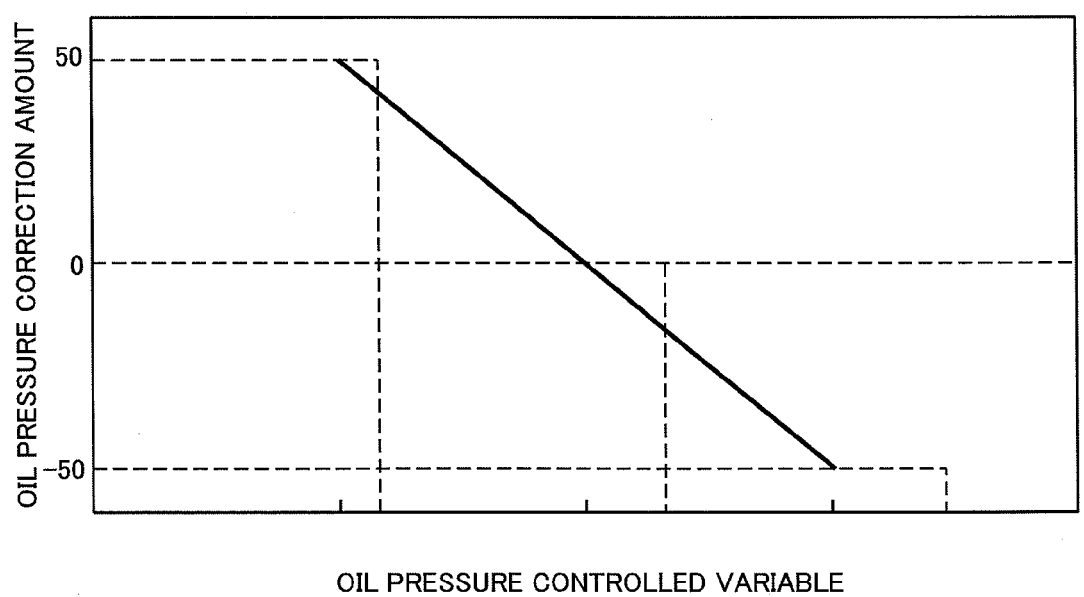
FIG. 4 is an illustrative view showing a correlation between an oil pressure controlled variable and an oil pressure correction amount.

In the correction amount writing processing, first the data held in the completion operation result storage device 6 and the vehicle code 2A of the vehicle body 100 incorporated with the automatic transmission 1 are read by the vehicle information reading device 8 and compared to each other. Then, the difference between the unique oil pressure controlled variable of the automatic transmission 1 and the reference controlled variable is written to the TCU 50 via the correction amount writing device 9 as the correction amount. Alternatively, a correction amount obtained from the correlation between the oil pressure controlled variable and the oil pressure correction amount, such as that shown in FIG. 4, is written to the TCU 50 via the correction amount writing device 9 as a learned value.

In the embodiment described above, the oil pressure controlled variable at the point where the input side turbine rotation speed varies is measured by gradually increasing the oil pressure from a state in which the output shaft of the automatic transmission is fixed and engagement thereof is released. Thus, the unique engagement starting point of the engagement elements in each automatic transmission can be learned accurately, and moreover, measurement can be performed quickly and with stability. As a result, the characteristic variation of the automatic transmission can be corrected without waiting for the promotion of learning through actual travel, and a favorable shift quality can be obtained.

Furthermore, in this embodiment an example in which the characteristic correction system for the automatic transmission 1 is constructed as a system on a production/shipping line in a factory was described, but the characteristic correction system may be constructed as a system installed in a vehicle. In this case, a test program in which the instruction input by the completion operation bench in the step S2 of the processing shown in FIG. 2 is changed to an instruction input into an engine control device or the like and the steps S9, S10 and S11 are omitted may be stored in the TCU 50 in advance.

By constructing the characteristic correction system in the TCU 50 on the vehicle side in this manner, the unique data can be measured quickly and with stability even when the automatic transmission 1 or TCU 50 is exchanged or the power of the TCU 50 is cut during inspection and repair by a market dealer to reset the learned value, and previous variation correction learning results can be recovered. As a result, deterioration of the shift quality can be avoided.

In addition to a shift clutch or another engagement element of an automatic transmission, the characteristic correction system described above may be applied to a control clutch or the like in a four-wheel drive transfer. Then, by correcting the relationship between the controlled variable and a transmission torque, the traction performance can be improved and an area for preventing the phenomenon of tight corner braking can be enlarged.

What is claimed is:

1. A characteristic correction system for an automatic transmission that performs a shift operation by engaging and disengaging engagement elements in a multi-stage transmission unit provided alongside a torque converter using respective hydraulic control valves, comprising:

means for releasing an arbitrary engagement element of said multi-stage transmission unit;

means for increasing an oil pressure applied to said released engagement element in a state where an input shaft rotation speed is fixed and an output shaft of said automatic transmission is fixed;

means for measuring an oil pressure controlled variable at a point where a turbine rotation speed of said torque converter varies;

means for determining a correction amount relative to a reference controlled variable from a measurement value of said oil pressure controlled variable; and means for storing said correction amount in an electronic control device for controlling said automatic transmission.

2. The characteristic correction system for an automatic transmission according to claim 1, wherein said oil pressure controlled variable at said point where said turbine rotation speed varies is measured at no less than two measurement points having different input shaft rotation speeds.

3. The characteristic correction system for an automatic transmission according to claim 1, wherein said correction amount is reflected in learning control for learning a characteristic of said automatic transmission.

4. A characteristic correction system for a transmission that engages and disengages engagement elements in the transmission provided alongside a torque converter using respective hydraulic control valves, comprising:

a unit configured to release an arbitrary engagement element of said transmission;

a unit configured to increase an oil pressure applied to said released engagement element in a state where an input shaft rotation speed is fixed and an output shaft of said transmission, is fixed;

a unit configured to measure an oil pressure controlled variable at a point where a turbine rotation speed of said torque converter varies;

a unit configured to determine a correction amount relative to a reference controlled variable from a measurement value of said oil pressure controlled variable; and a unit configured to store said correction amount in an electronic control device for controlling said transmission.

5. The characteristic correction system for a transmission according to claim 4, further comprising:

an operation bench which positions the transmission in the state wherein the input shaft rotation speed is fixed and the output shaft is fixed.

* * * * *